Dec. 4, 1923.                                                  1,476,542
                         S. RASMUSSEN
                   SUPPORTING DEVICE FOR CASINGS
                      Filed April 19, 1923
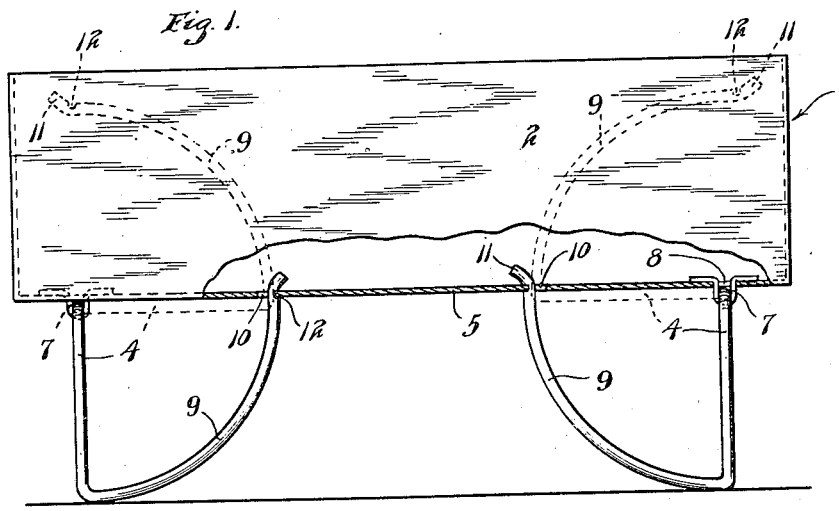
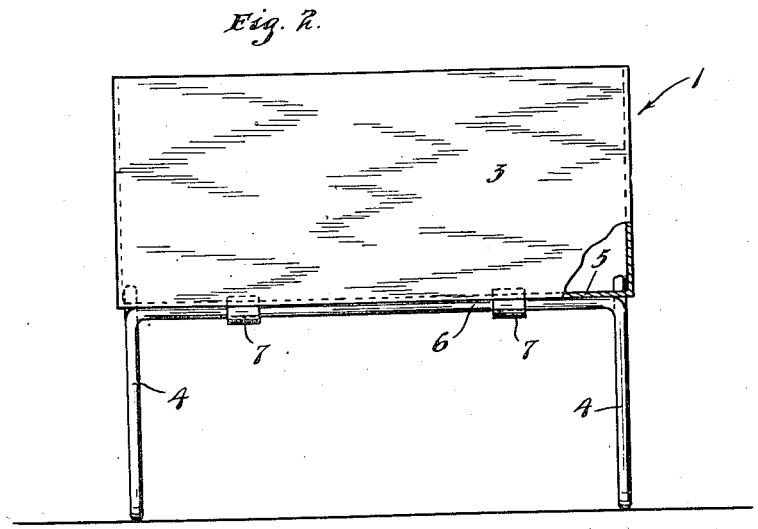
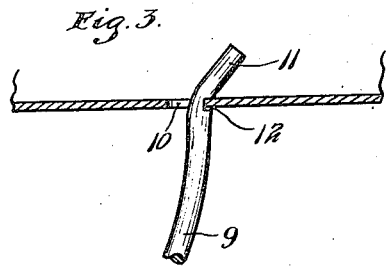
INVENTOR.
SOPHUS RASMUSSEN.
BY HIS ATTORNEY.

Patented Dec. 4, 1923.

1,476,542

UNITED STATES PATENT OFFICE.

SOPHUS RASMUSSEN, OF ALBERT LEA, MINNESOTA, ASSIGNOR TO AMERICAN GAS MACHINE COMPANY, OF ALBERT LEA, MINNESOTA, A CORPORATION OF MINNESOTA.

SUPPORTING DEVICE FOR CASINGS.

Application filed April 19, 1923. Serial No. 633,118.

*To all whom it may concern:*

Be it known that I, SOPHUS RASMUSSEN, a citizen of the United States, residing at Albert Lea, in the county of Freeborn and State of Minnesota, have invented certain new and useful Improvements in Supporting Devices for Casings; and I do hereby declare the following to be a full, clear, and exact description of the invention, such as will enable others skilled in the art to which it appertains to make and use the same.

This invention relates to a supporting device and particularly to such a device especially adapted for use in combination with a vessel, casing or container formed of sheet material. The invention in practice has been applied to the casing of a camp stove, which casing is of simple rectangular form, although it is obvious that the invention is applicable to other casings as well.

It is an object of this invention to provide a simple form of supporting means for the casing which is pivoted to the casing and adapted to be swung into and out of the same.

It is a further object of the invention to provide such a supporting means comprising angularly extending arms having curved portions moving through openings in the bottom of the casing.

It is still another object of the invention to have adjacent supporting means connected in the form of a bail, the ends of which carry the curved arms, which arms have means engaging the casing to hold them in their outward or supporting positions.

These and other objects and advantages of the invention will be fully set forth in the following description made in connection with the accompanying drawings, in which like reference characters refer to the same parts throughout the different views, and in which—

Fig. 1 is a view in side elevation of the casing with the supporting means thereon, a portion thereof being shown in section and the inward position of the supporting means being indicated in dotted lines;

Fig. 2 is a view in end elevation of the casing and supporting means, a small portion thereof being shown in section; and Fig. 3 is a fragmentary view showing the locking means for the supporting members, the same being shown on an enlarged scale.

Referring to the drawings, a casing 1 formed of sheet material is illustrated and while said casing may have any desired form, the same is illustrated as being of rectangular shape having side walls 2 and end walls 3. A supporting member is provided adjacent each corner of the casing, which comprises an arm 4 projecting outwardly from the bottom of the casing and, as illustrated, substantially perpendicular thereto. Each supporting member also has an arm extending at an angle to the arm 4 and along the bottom 5 of the casing 1 to which bottom it is pivoted. In the embodiment of the invention illustrated, these latter arms are formed as one piece 6 extending across the bottom of the casing, so that the members 4 and 6 form a bail with right angle bends. The member 6 is pivotally secured along the bottom 5 by passing through clips 7, having U-shaped portions projecting through openings 8 formed in the bottom 5 and having their arms bent in opposite directions into engagement with the inner side of the bottom 5. Each arm 4 has a curved portion 9 extending from its outer end in a plane substantially perpendicular to the plane of the bail formed by members 4 and 6 and the members 9 are adapted to pass through small slots or openings 10 formed in the bottom 5. The arms 9 have their terminal ends 11 bent outwardly and are provided adjacent said bent portions with slots 12 formed at their outer sides, which slots are of a size approximately to fit the bottom 5 of the casing. The arms 9 are formed on substantially the arc of the circle, the center of which is in the axis of the member 6, but said arms have a slightly increasing radius toward their outer end and the material thereof is somewhat resilient. While the members 4, 6 and 9 could be formed of various materials, as illustrated, the same are formed of small rods or stiff wire.

In operation, when it is desired to support the casing 1, the bails and arms 9 are swung about the axis of the member 6 and the arms 9 will press outwardly against the sides of opening 10 due to their resiliency and to the fact that they are formed with a slightly increasing radius. When the arms 4 are in position substantially perpendicular to the bottom 5, the slots 12 will engage with the bottom 5, as shown in Figs. 1 and 3 and the arms 9 will firmly be locked in position. A firm and stable support is thus furnished for the casing 1. When it is desired to transport the casing 1, the ends of arms 9 will be pressed slightly inwardly to disengage the slots 12 and the bails and arms 9 can then be swung about the axis of the member 6 and the arms 9 will pass into the casing 1 and lie in close proximity to the side walls 2 thereof and the arms 4 will lie in close contact with the outer side of the bottom 5. The supporting means is thus disposed largely on the inside of the casing and takes up practically no room outside of the casing. The arms 9 being disposed close to the side walls 2, the space inside of the casing is practically unobstructed. The terminal bent ends 11 of the arms 9 form stop means preventing the withdrawal of the arms 9 through the openings 10 and also assist in the secure engagement of slots 12 with the bottom 5. These ends also form means whereby the arms 9 can be moved to disengage the slots 12, from the interior of the casing.

From the above description, it is seen that applicant has provided a very simple and efficient supporting means for a casing. The invention has in practice been found to have great utility with the casing of a camp stove, although it is apparent that it could be used for ovens and any other types of vessels or containers. The supporting means is easily and quickly movable to operative or inoperative position. The same is quite inexpensive, very simple and has no tendency to become disarranged or get out of order.

It will, of course, be understood that various changes may be made in the form, details and arrangement and proportions of the parts without departing from the scope of applicant's invention, which generally stated consists in the device capable of carrying out the objects above enumerated and such as shown and described and defined in the appended claims.

What is claimed is:—

1. The combination with a casing having a bottom wall of sheet material, of a supporting member having angularly extending arms and being pivoted about one of said arms along said bottom wall, the other arm being adapted to extend outwardly from said wall and having a curved extension at its outer end disposed in a plane substantially perpendicular to the plane determined by said arms, said extension being adapted to move through an opening in said wall as the member swings about its pivoted arm.

2. The structure set forth in claim 1, said curved extension having means adapted to engage said bottom wall to hold the same in its outward position.

3. The combination with a casing, having a bottom wall of a bail pivoted along said wall, the ends of said bail having curved arms extending therefrom in planes substantially perpendicular to the plane of said bail and adapted to move thru openings in said bottom wall when the bail swings about its pivot.

4. The structure set forth in claim 3, said curved arms being resilient and having means adjacent their free ends adapted to engage said bottom wall and hold said arms in their outwardly disposed position.

5. The combination with a casing, having a bottom wall of sheet material and upstanding walls of a support therefor comprising a bail pivoted transversely of said bottom wall at the exterior thereof, the ends of said bail having curved arms extending therefrom in planes substantially parallel to said upstanding walls and movable through openings in said bottom wall when the bail swings about its pivot, said openings being adjacent said upstanding walls so that said arms are disposed in close proximity to said upstanding walls when in their inward position.

6. The combination with a casing having a bottom wall of sheet material, of a supporting member comprising a bail extending along the exterior of said wall and pivoted thereto, the ends of said bail having curved arms extending therefrom in planes substantially perpendicular to the plane of said bail and adapted to move through openings in the bottom of said wall when the bail swings on its pivot, said arms having slots adjacent their terminal ends, which slots are adapted to engage the sides of said openings to lock said arms in their outward position.

7. The structure set forth in claim 6, said curved arms being resilient and formed on a slightly increasing radius turning about the axis of said pivot, whereby they will frictionally engage the sides of said openings in their swinging movement.

8. The structure set forth in claim 6, said curved arms having their terminal ends bent to form stop means adapted to prevent their withdrawal through said openings.

In testimony whereof I affix my signature.

SOPHUS RASMUSSEN.